Figure 6:
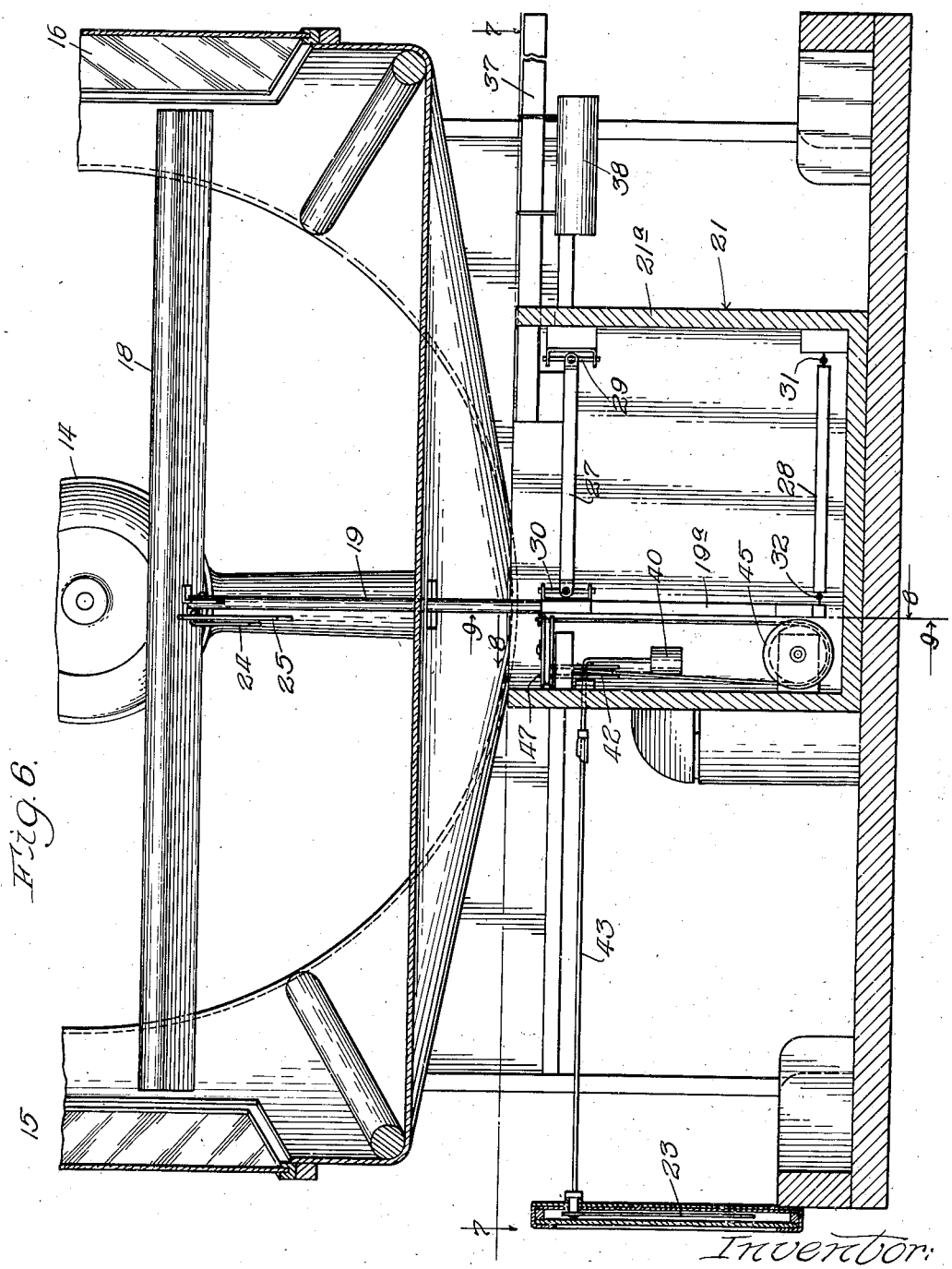

July 31, 1945. C. GOLDBERG 2,380,516
WIND TUNNEL BALANCE
Filed Jan. 11, 1943 4 Sheets-Sheet 1
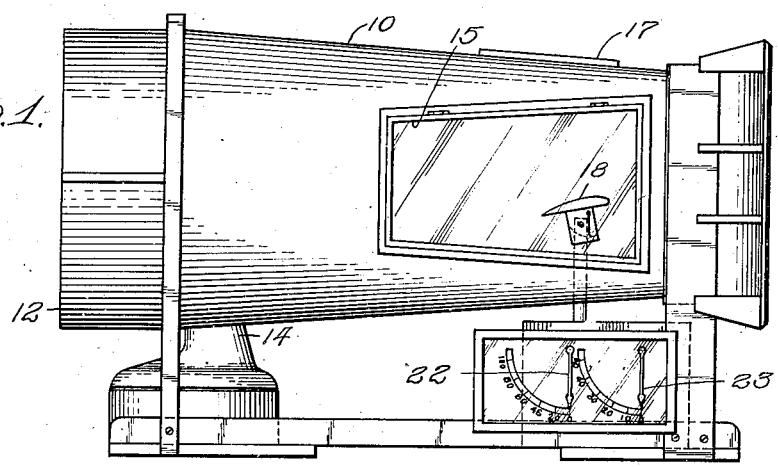
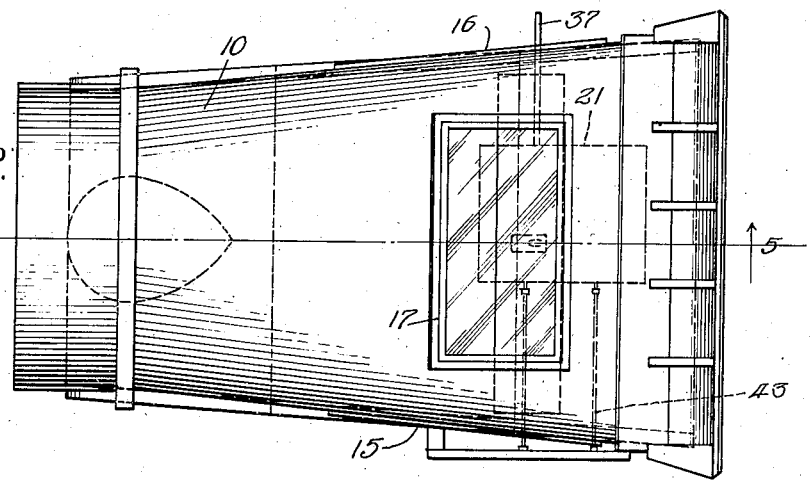
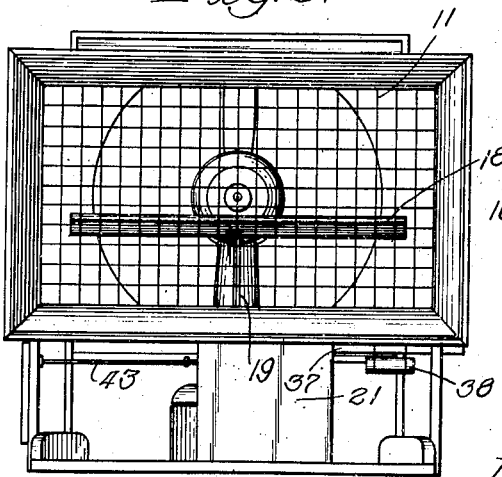
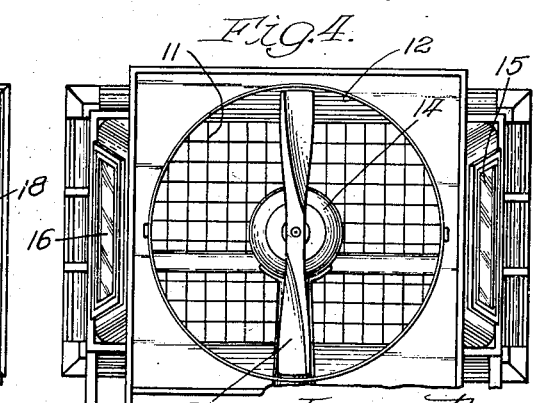

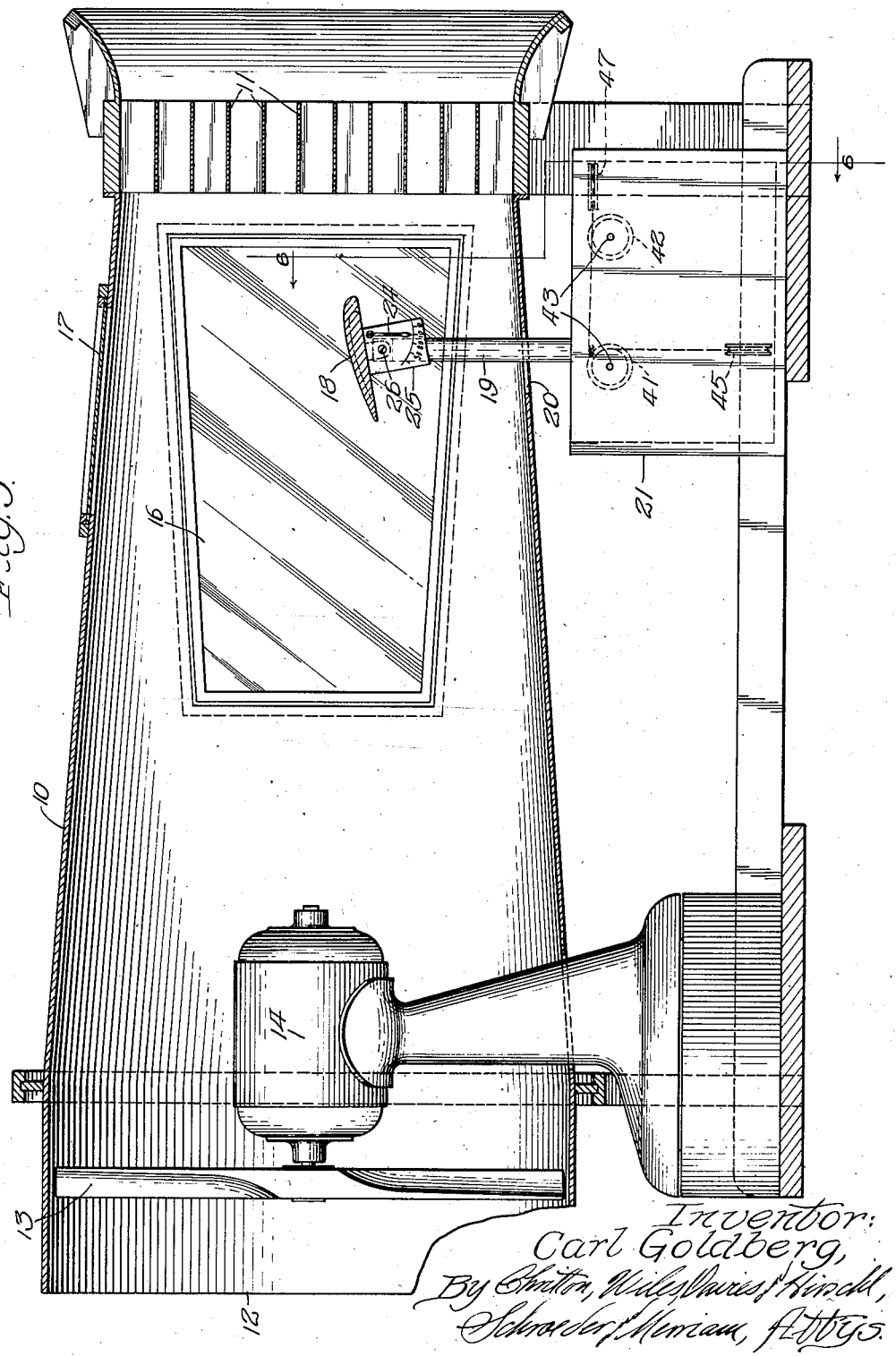

July 31, 1945.  C. GOLDBERG  2,380,516
WIND TUNNEL BALANCE
Filed Jan. 11, 1943  4 Sheets-Sheet 3

Inventor:
Carl Goldberg,
By Clinton, Wiles, Davies, Hinckle,
Schroeder & Merriam, Attys.

July 31, 1945.   C. GOLDBERG   2,380,516
WIND TUNNEL BALANCE
Filed Jan. 11, 1943   4 Sheets-Sheet 4
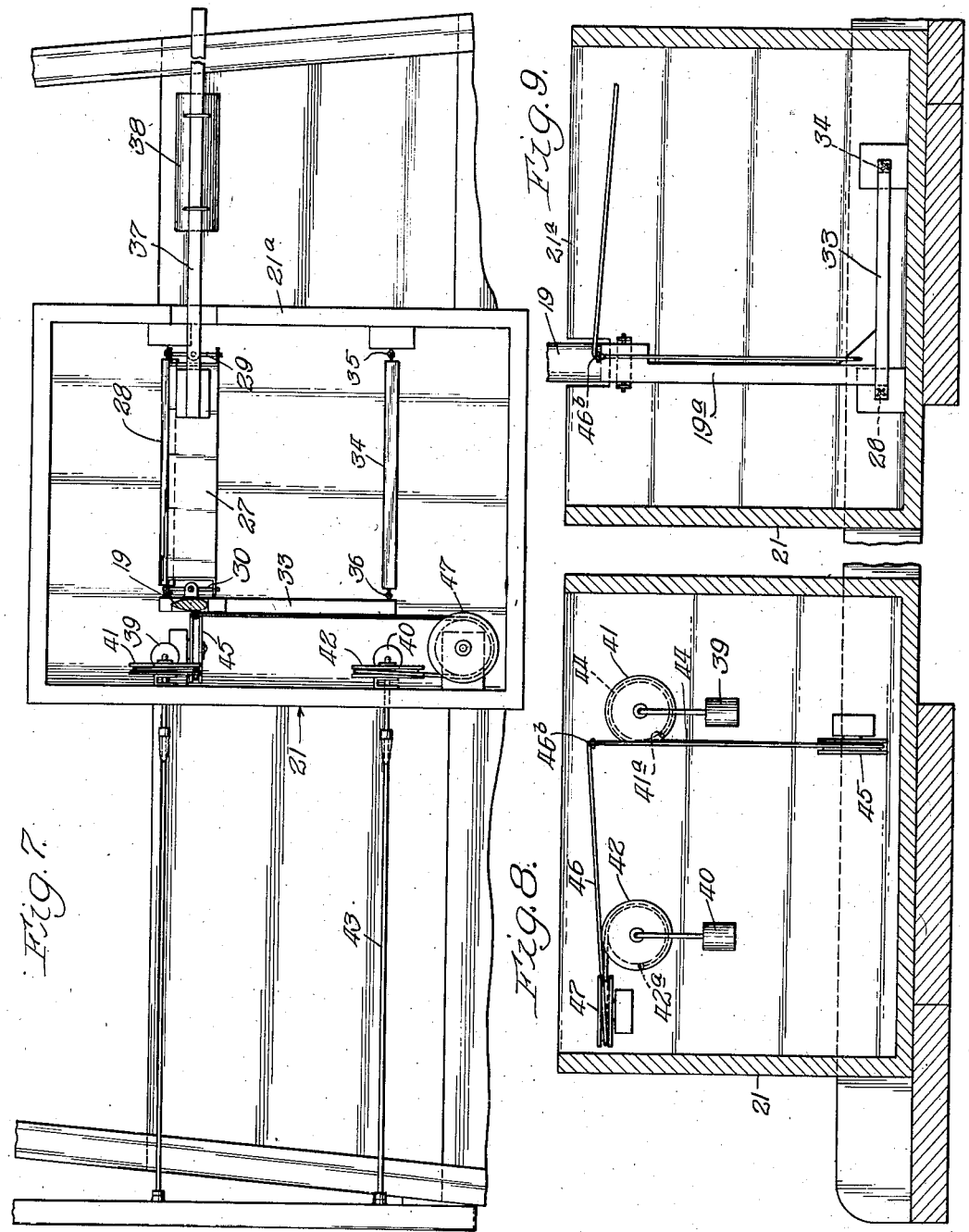
Inventor:
Carl Goldberg, Patented July 31, 1945

2,380,516

UNITED STATES PATENT OFFICE 2,380,516

WIND TUNNEL BALANCE

Carl Goldberg, Chicago, Ill., assignor to Comet Model Airplane & Supply Company, Incorporated, a corporation of Illinois Application January 11, 1943, Serial No. 471,948

10 Claims. (Cl. 73—147)

This invention relates to a wind tunnel balance for testing models.

One feature of this inventoin is that it is an improved wind tunnel adapted to provide simultaneous automatic indications or readings of both the lift and drag of the element being tested in the air stream; another feature of this invention is the use of a single mounting strut and the complete elimination of guy wires; still another feature of this invention is the provision of means for maintaining unchanged the angle of attack to the air stream during movements of the element incident to operation of the lift and drag indicators; yet another feature is the use of two movable interconnected parallelograms perpendicular to each other for permitting full freedom of movement of the element in a desired plane while preventing change of the angle of attack or any movement out of such plane; a further feature of this invention is the provision of simple yet accurate indications of lift and drag forces, respectively, by balancing these forces separately against two movable weights; and a still further feature is the unitary arrangement of the supporting means and force balancing means so that these can be removed as a unit from operative relation with the wind tunnel. Other features and advantages of this invention will be apparent from the following specification and drawings, in which:

Figure 1 is a side elevation of one embodiment of this invention; Figure 2 is a plan view of the wind tunnel; Figure 3 is a front elevation of the tunnel showing the air inlet; Figure 4 is a rear elevation of the tunnel, showing the air outlet; Figure 5 is an enlarged vertical sectional view along the line 5—5 of Figure 2; Figure 6 is a fragmentary transverse sectional view along the line 6—6 of Figure 5; Figure 7 is a plan view of the unit comprising the balancing and indicating mechanism, along the line 7—7 of Figure 6; Figure 8 is a transverse view of this unit, partly in section, along the line 8—8 of Figure 6; and Figure 9 is a view of said unit in the opposite direction to that of Figure 8, along the line 9—9 of Figure 6.

The desirability of testing models in a low speed air stream, and particularly of doing this in such a way that class-room instruction in the elements of aeronautics may be facilitated, has led me to devise the improved low speed wind tunnel described herewith. Previous arrangements known to me had certain definite objections which my novel wind tunnel overcomes. Some of these objectionable features of earlier arrangements, for example, were: the necessity of guy or supporting wires which rendered it difficult to change the angle of attack; inability to measure both lift and drag at the same time; variations in the angle of attack of the element being tested during drag measurement, so that the drag indicated would be at a different angle of attack from that initially determined; and the necessity for manually balancing, as by weights in a pan, the particular force being measured. My tunnel overcomes these objections by using a rigid strut as the supporting element; by giving a simultaneous indication of both lift and drag; by maintaining the angle of attack unchanged during movement of the element necessary to automatically provide such indications; and by making the balancing operation automatic.

In the particular embodiment of my invention disclosed herewith a tunnel 10 of suitable material, as fiber, is provided with an inlet grill 11 and an outlet opening 12, air being sucked through the tunnel and forced out the outlet by the high-speed propeller 13, which may have a diameter of 16 inches, for example, this being driven by a conventional electric motor 14. Drawing or sucking the air through the tunnel provides a smooth air flow at the forward end of the tunnel where the model plane, wing section, or other element is being tested. The tunnel is provided with side windows 15 and 16 and a top window 17 to facilitate inspection during testing.

The element to be tested, here shown as a wing section 18, is pivotally mounted at the upper end of a streamlined vertical strut 19 projecting up into the tunnel through an opening 20 provided in the bottom for this purpose. The strut is movably supported, in such a way as to permit desired movement and prevent undesired movement, by mechanism in the box or housing 21, which will be more fully described; and it is appropriately connected to force balancing means and to indicator actuating elements which are connected to the pointers 22 and 23 of lift and drag indicating means, these pointers cooperating with appropriate lift and drag scales best seen in Figure 1.

The element 18 under testing may have its angle of attack to the air stream measured in any suitable way, this being done in the present instance by a free swinging pointer 24 cooperating with a scale or a card 25 movable with the element 18, this scale being graduated in degrees. The wing section or other element is movably connected to the upper end of the strut 19 in the present case by means pivotal about an axis provided by the clamping or locking screw 26. By the use of this mounting the element under test may be readily moved to any desired angle with respect to the vertical strut and locked in that position, the angle of attack thereafter being maintained by reason of the fact that the strut is maintained vertical during its slight movement incident to operation of the indicating device.

Referring now more particularly to Figures 6-9, it will be seen that the strut 19 extends down into the unit or housing 21 and that its lower end forms part of what may be termed a vertical parallelogram comprising the lower end 19a of the strut, upper and lower side members 27 and 28, and a portion of the wall or side 21a of the housing. As may be best seen in Figure 6, the arm or member 27 is connected to the wall by a universal joint 29 and to the strut by a universal joint 30; and the lower member 28 is connected to the wall and to the strut by the joints 31 and 32. It is essential that all these joints be universal in nature, permitting movement of the parallelogram in any direction; but it is essential that at least two of the joints (here the joints 29 and 30) be of the nonrotatable type, so that the side member 27 acts as a torsion arm preventing rotation of the strut 19 during movement in the plane in which it lies. Universal but nonrotatable movement of the joints 29 and 30 is provided by making them of the double bearing (or crossed pin) type.

The strut 19 is rigidly connected at its lower end, as may be best seen in Figure 9, to another member 33, this and the strut being perpendicular. As may be best seen in Figure 7, this member 33, the lower member 28 of the first parallelogram, the member 34, and a portion of the side wall 21a of the housing provide a second parallelogram perpendicular to the one first described. In these parallelograms the wall forms a rigid supporting member and the strut and arm 33 (rigidly connected together) form a movable unit maintained parallel to the wall by the other sides of the parallelograms, the members 27, 28 and 34. The member 34 has joints 35 and 36 at its ends, these and the joints 31 and 32 being merely interlocking closely fitting eyelets, so that all of the joints provide universal movement, but the joints associated with the torsion arm 27 prevent rotation of the strut 19 in its plane. The arm 27 has rigidly connected to it a balancing arm 37 extending out of the housing 21 and supporting a movable weight 38 adapted to be adjusted, with no air movement through the tunnel, to exactly counterbalance the weight of the element being tested, the strut, and the supporting parallelogram members.

As may be best seen in Figure 8, a lift balancing weight 39 and a drag balancing weight 40 are carried by pulleys 41 and 42, respectively, pivotal about their centers. While movement of these pulleys might be directly indicated at the housing, they are for convenience connected through rods to the pointers 22 and 23, the connection of the pulley 42 to the pointer 23 through the rod 43 being shown, for example, in Figure 6. The cord or similar flexible connecting member 44 has one end fastened to the pulley 41, as at the point 41a, passes around the pulley, extends down vertically under and partly around an idler pulley 45, and connects to the strut at the point 46b, so that any upward movement of the strut causes movement of the lift indicating pointer, the force causing movement of the pulleys until the weight 39 is sufficiently displaced from the vertical to balance this force. The pulley 42 similarly has a cord 46 connected to it at the point 42a, passing partly around the pulley, around an idler pulley 47, and making connection at its other end 46b to the strut. This arrangement provides an automatic indication of the amount of drag on the element being tested as the strut moves backward in the tunnel until the weight 40 balances such drag. The use of the idler pulley, and the connection of the cords to the strut at a point substantially spaced from these pulleys, results in the lift and drag indications being independent. That is, backward movement alone of the strut causes a drag indication only; upward movement alone causes a lift indication only; and an angularly upward and backward movement (as is usually the case) is automatically resolved into the lift and drag components. Moreover, any stretch in the cords is automatically compensated for, since the element moves in the air stream without resistance until the weights start to swing up from their lower-most position; and the device is quite sensitive, a particular embodiment built by me having a sensitivity in the neighborhood of one-thousandth of an ounce and being readable, on the indicators, to less than one-hundredth of an ounce. This particular low speed wind tunnel, of course, was only designed to measure forces up to about one ounce, since this is about the maximum encountered in wind speeds in the neighborhood of ten miles an hour or so with small models or sections.

The provision of the supporting and force balancing mechanism in a single unit within the housing 21 is particularly important, since it enables this mechanism to be removed from the wind tunnel, for convenient inspection, adjustment, repair, or lubrication by merely uncoupling the rods connected to the lift or drag indicating pointers. Moreover, this compact unitary arrangement with its enclosed housing protects the more delicate parts from damage during use of the tunnel by relatively inexperienced persons.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for movably supporting a strut adapted to support an element in an air stream, including: a movable parallelogram having a portion of the strut as one side thereof and supporting means as the opposite side thereof; and a second movable parallelogram having one side thereof rigidly connected to one side of the first-mentioned parallelogram and supporting means as the opposite side thereof, the construction and arrangement being such that said strut is movable only in a desired plane.

2. Apparatus of the character described for movably supporting a strut adapted to support an element in an air stream, including: a movable parallelogram having a portion of the strut as one side thereof and supporting means as the opposite side thereof; and a second movable parallelogram having one side thereof rigidly connected to said strut and supporting means as the opposite side thereof, the construction and arrangement being such that said strut is movable only in a desired plane and is maintained at a desired angle during such movement.

3. Apparatus of the character claimed in claim 2, wherein the rigidly connected side is perpendicular to said strut and the planes of said parallelograms are perpendicular.

4. Apparatus of the character claimed in claim 1, wherein all of the connections between the sides of the parallelograms permit movement in more than one direction.

5. Apparatus of the character claimed in claim 1, including means for balancing the weight of the element, strut, and parallelograms.

6. Apparatus of the character described for movably supporting a strut adapted to support an element in an air stream, including: a movable parallelogram having a portion of the strut as one side thereof and supporting means as the opposite side thereof, one of the sides making connection to said strut having universal but non-rotatable joints at each end thereof; and a second movable parallelogram in a plane perpendicular to that of the first-mentioned parallelogram, said second parallelogram having one side rigidly connected to said strut perpendicular thereto and supporting means as the opposite side thereof.

7. Apparatus of the character described for movably supporting a vertical strut adapted to support an element in an air stream, including: a vertical wall member parallel to and spaced from the strut; a pair of parallel side members movably connecting the wall member and strut; another side member having one end rigidly connected to the strut, this member being parallel to the wall member and perpendicular to the strut; and another side member connecting the other end of the last-mentioned side member and the wall member, one of said pair of side members having universal but non-rotatable joints at each end thereof and all of the other connections comprising universal joints.

8. Apparatus of the character claimed in claim 7, including means for balancing the weight of the element, strut and parallelograms, this means being connected to one of said pair of parallel side members.

9. Apparatus of the character claimed in claim 6, wherein the strut supporting apparatus is part of a unit assembly adapted to be placed in operative relation to a wind tunnel and wherein said unit assembly also includes means providing forces adapted automatically to balance the forces exerted upon the strut.

10. Apparatus of the character claimed in claim 6, including means providing separate forces adapted to automatically balance the lift and drag, respectively, exerted upon said element by the moving air, this means comprising a pair of pivotally mounted weights and cords connecting them to the supporting means.

CARL GOLDBERG.